May 7, 1935.  H. B. SIMMONS  2,000,196
PNEUMATIC SUSPENSION FOR VEHICLES
Filed Nov. 6, 1933  2 Sheets-Sheet 1
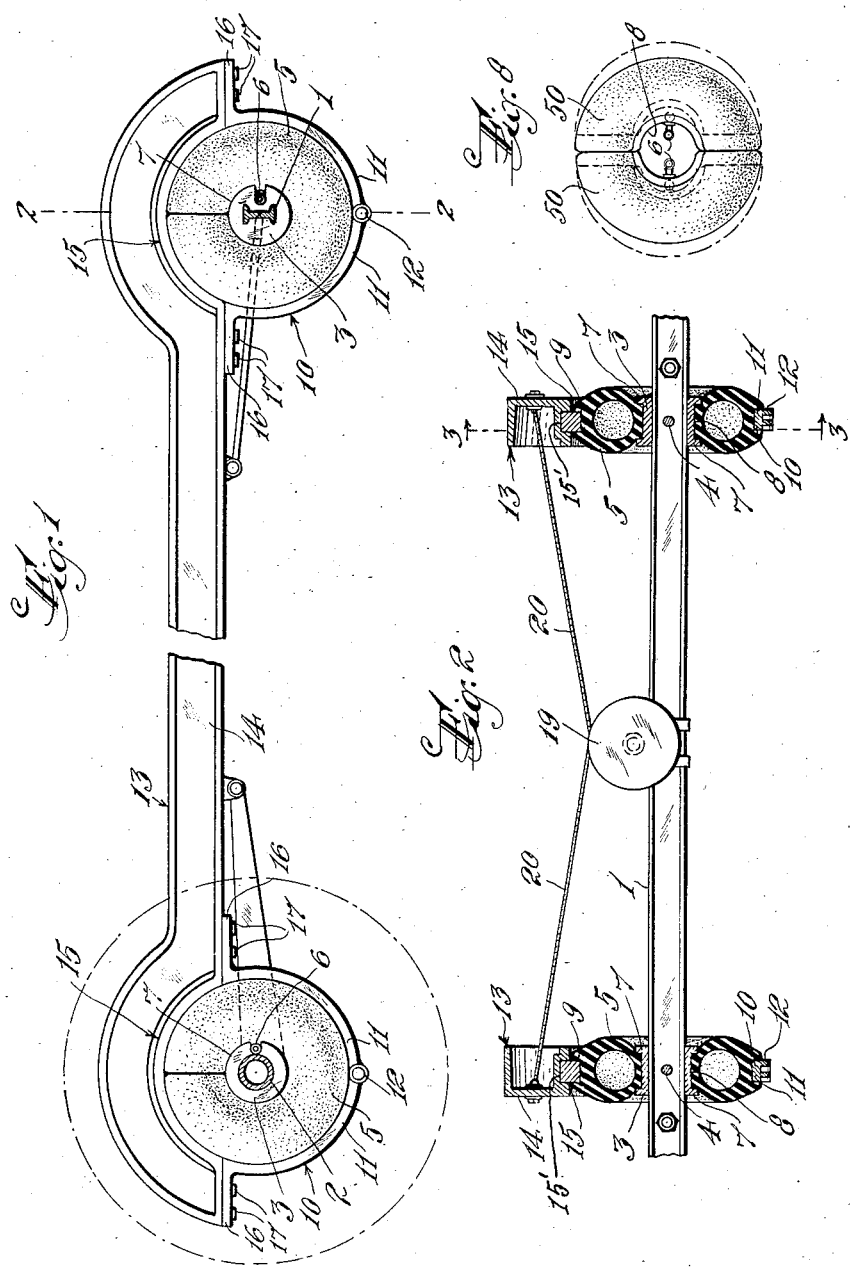
INVENTOR
Harold B. Simmons,
BY
Harry S. Rook,
ATTORNEY May 7, 1935. H. B. SIMMONS 2,000,196
PNEUMATIC SUSPENSION FOR VEHICLES
Filed Nov. 6, 1933 2 Sheets-Sheet 2
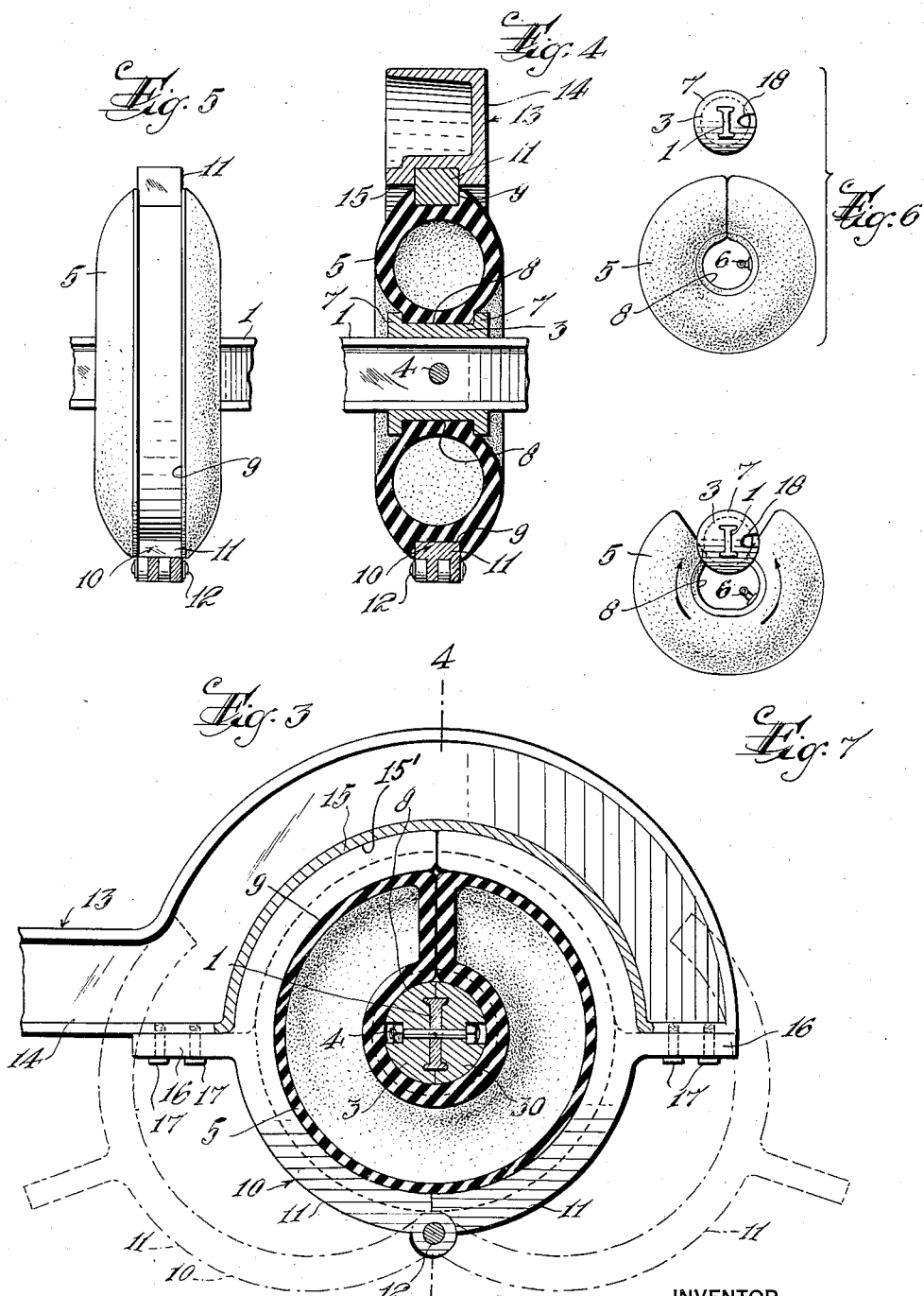

Patented May 7, 1935

2,000,196

UNITED STATES PATENT OFFICE 2,000,196

PNEUMATIC SUSPENSION FOR VEHICLES

Harold B. Simmons, Caldwell, N. J.

Application November 6, 1933, Serial No. 696,792

5 Claims. (Cl. 267—35)

This invention relates in general to the mounting or suspension of the frame or chassis of a vehicle, particularly an automobile, on the running gear, and more especially the invention is directed to the use of pneumatic cushions whereby the usual heavy and relatively stiff or inflexible metal springs can be eliminated.

I am aware that it has been proposed to use pneumatic cushions for mounting vehicle frames on the running gear, for example as shown in Patent No. 1,439,617 dated December 19, 1922; but known pneumatic suspensions of this general character are complicated and expensive and do not provide safe or adequately resilient supports for the vehicle frames.

One object of my invention is to provide a vehicle pneumatic suspension of the general character described which shall embody novel and improved features of construction wherein the vehicle frame shall be directly connected to and mounted on the pneumatic cushion to provide a low center or gravity in the vehicle and to reduce lateral movement or tendency to tipping of the frame to the minimum, so that the frame shall be securely supported and at the same time a maximum of resiliency shall be obtained, and the shock or rebound shall be reduced to the minimum whereby the necessity for shock absorbers shall be obviated.

Another object is to provide such a pneumatic suspension for vehicle frames wherein the pneumatic cushions shall encircle the vehicle axles in substantially direct contact therewith, and portions of the vehicle frame shall partially surround or embrace the pneumatic cushions to ensure a safe and secure connection of the frame to the cushions, maximum of resiliency and minimum tendency to lateral or swaying movement of the frame.

Other objects are to provide a vehicle pneumatic suspension of this character including a novel and improved cushion and means for mounting it on the vehicle axle; to provide a novel and improved strap for connecting the vehicle frame to the cushion; to provide such a vehicle suspension which shall include a small number of parts and shall be simple, durable and inexpensive; and to obtain other advantages and results as will be brought out by the following description.

Referring to the accompanying drawings in which corresponding and like parts are designated throughout the several views by the same reference characters, Figure 1 is a side elevation of an automobile chassis and pneumatic suspension embodying my invention, the axle being shown in transverse section.

Figure 2 is a vertical sectional view on the line 2—2 of Figure 1,

Figure 3 is an enlarged longitudinal vertical sectional view on the line 3—3 of Figure 2, Figure 4 is an enlarged vertical sectional view on the line 4—4 of Figure 3.

Figure 5 is a front elevation of one of the pneumatic cushions with one section of the strap broken away and shown in section.

Figure 6 is a schematic side elevation of the cushion and end elevation of the axle in separated relation, Figure 7 is a similar view showing the manner of applying the cushion to the axle and Figure 8 is a side elevation of a modified form of pneumatic cushion.

Specifically describing the illustrated embodiment of the invention, the reference characters 1 and 2 designate respectively the front and rear axles of an automobile. Each axle has a pair of collars 3 spaced longitudinally thereof. These collars may be formed integrally with the axle or consist of two sections 30 as shown in Figure 3 which are applied to the axle from opposite sides thereof and connected together by bolts 4.

Mounted upon each collar 3 is a resilient cushion 5 which is shown as pneumatic and annular in shape. Preferably the cushions are circular, although the configuration thereof may be modified as desired. The cushions may be in the form of a split ring and slipped over the respective collars as shown in Figure 7 or the cushions may be formed of two sections 50 and applied to the collars from opposite sides thereof, as shown in Figure 8. The cushions are, of course, formed of suitable material such as rubber, and may be inflated in any suitable manner, for example through valves 6 in the same way in which pneumatic tires are inflated.

Each collar 3 has end flanges 7, and the inner peripheries 8 of the cushions are formed to snugly fit between the flanges of the collars. The outer peripheries of the cushions have peripheral or circumferential grooves 9 to receive straps 10 for connecting the cushions to the chassis of an automobile. As shown, each strap comprises two sections 11 which are hingedly connected at one end as at 12 so as to form the strap in the nature of a split ring which can be slipped over the cushion 5 as shown by dot and dash lines in Figure 3.

The chassis 13 of the automobile includes two side bars 14 each of which has seats 15 conforming in shape to portions of the peripheries of the respective cushions 5 so as to directly receive the cushions as shown in Figures 1 to 3 inclusive. As shown, these seats 15 are arcuate and concentric with the circular cushions. Also, the seats 15 preferably have grooves 15' to directly receive portions of the outer peripheries of the respective straps 10. For holding the sections 11 of the strap together against relative movement and for connecting the straps to the chassis, each strap section is provided with a lateral lug 16 which is secured to the chassis by bolts or screws 17. Preferably the lugs 16 of each strap are disposed in the same chordal plane of the strap, although the lugs may have other relations to the straps where desired.

With this construction, the vehicle frame is directly connected to and mounted on the pneumatic cushions which encircle the axles, whereby a low center of gravity in the vehicle is ensured and tendency to lateral movement or tipping of the frame is reduced to the minimum. The cushions 5 are highly resilient so as to ensure substantially complete absorption of shocks incident to running of the vehicle, the cushions also serving to reduce the shocks of rebound, whereby the necessity for shock absorbers is obviated. The straps 11 provide simple and effectual means for positively connecting the chassis or vehicle frame to the cushions, and the mounting of these straps in the grooves in the cushions and in the grooves in the seats 15 of the chassis, provides resistance to movement of the vehicle frame laterally relative to the cushions.

The cushions are preferably of a structure similar to so-called balloon tires so as to have a high degree of resiliency, although the structure of the cushions may be modified to suit different conditions, for example, in heavy vehicles the cushions would be made heavier than in light passenger vehicles.

Cushions may be inflated in any suitable manner, as through the valves 6, and such valves may be mounted as desired; for example the valve may project from the inner periphery of the cushion and be seated in a recess 18 in the collar 3.

To further restrain swaying or lateral movement of the chassis I may utilize a known type of spring device commonly called a snubber and designated 19 on the drawings. This device may be mounted at the middle of the axle and have flexible connectors 20 connected to opposite side bars 13 of the chassis. The springs within the device 19 will yieldingly restrain lateral movement of the chassis. Obviously, other suitable means may be used for the same purpose.

It will be understood by those skilled in the art that the embodiment of the invention illustrated and described is primarily for the purpose of illustrating the principles of the invention and that the invention may be embodied in many different details of construction without departing from the spirit or scope of the invention.

Having thus described my invention, what I claim is:

1. The combination of a chassis, an axle, an annular resilient cushion mounted on and encircling the axle in close relation thereto and having a peripheral groove, an annular strap in said groove encircling said cushion and having a substantial portion of its periphery in direct contact with said chassis, and means fastening said strap to said chassis.

2. The combination of an axle, an annular resilient cushion mounted on and encircling the axle, a chassis having a portion conforming to a part of the outer periphery of said cushion, said cushion having a peripheral groove, an annular strap in said groove encircling said cushion, and said portion of the chassis having a groove directly receiving a portion of said strap, and means for fastening said strap to said chassis.

3. The combination of a chassis, an axle, an annular resilient cushion mounted on and encircling the axle in close relation thereto, an annular strap encircling said cushion in direct engagement therewith and having a substantial portion of its periphery in direct engagement with said chassis, said annular strap including two hingedly connected segmental sections and means connecting each section to said chassis to hold said sections against relative movement and to fasten said strap to the chassis.

4. The combination of a chassis, an axle, an annular resilient cushion mounted on and encircling the axle in close relation thereto, an annular strap encircling said cushion in direct engagement therewith and having a substantial portion of its periphery in direct engagement with said chassis, said annular strap including two hingedly connected segmental sections each having a lateral lug, and means connecting said lugs to said chassis to hold said sections against relative movement and to fasten said strap to the chassis.

5. The combination of a chassis, an axle, an annular resilient cushion mounted on and encircling the axle in close relation thereto and having a peripheral groove, an annular strap in said groove encircling said cushion, and means fastening said strap to said chassis.

HAROLD B. SIMMONS.